(12) United States Patent
Alvarez Jaime et al.

(10) Patent No.: US 10,266,181 B2
(45) Date of Patent: Apr. 23, 2019

(54) TIRE BLOWOUT CONTROL

(71) Applicant: Ford Global Technologies, LLC, Dearborn, MI (US)

(72) Inventors: Angel Alvarez Jaime, Atizapan/Estado de Mexico (MX); Zaid Moises Morales Martinez, Distrito Federal/Distrito Federal (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 36 days.

(21) Appl. No.: 15/378,387

(22) Filed: Dec. 14, 2016

(65) Prior Publication Data

US 2018/0162411 A1 Jun. 14, 2018

(51) Int. Cl.
*G07C 5/08* (2006.01)
*B60W 50/00* (2006.01)
(Continued)

(52) U.S. Cl.
CPC ......... *B60W 50/0097* (2013.01); *B60K 28/14* (2013.01); *B60W 10/04* (2013.01); *B60W 10/06* (2013.01); *B60W 10/18* (2013.01); *B60W 10/184* (2013.01); *B60W 30/02* (2013.01); *B60W 30/12* (2013.01); *G07C 5/085* (2013.01); *G07C 5/0808* (2013.01); *B60W 2510/06* (2013.01); *B60W 2510/18* (2013.01); *B60W 2510/20* (2013.01); *B60W 2530/20* (2013.01);
(Continued)

(58) Field of Classification Search
CPC .. B60W 50/0097; B60W 10/04; B60W 10/18; B60W 30/02; B60W 30/12; G07C 5/0808; G07C 5/085
See application file for complete search history.

(56) References Cited

U.S. PATENT DOCUMENTS 4,313,616 A * 2/1982 Howard ................ B60D 1/322
188/112 A
5,696,681 A 12/1997 Hrovat et al.
(Continued)

FOREIGN PATENT DOCUMENTS

CN 101380876 B 4/2011
CN 102050096 A 5/2011
(Continued)

OTHER PUBLICATIONS

Qingzhang Chen et al., "Stability Control of Vehicle Emergency Braking with Tire Blowout", International Journal of Vehicular Technology, vol. 2014, Article ID 436175, published Mar. 11, 2014.
(Continued)

*Primary Examiner* — Behrang Badii
*Assistant Examiner* — Daniel L Greene
(74) *Attorney, Agent, or Firm* — Frank A. MacKenzie; Bejin Bieneman PLC

(57) ABSTRACT

A vehicle control system to mitigate adverse effects relating to the performance and stability of a vehicle that experienced a tire blowout includes a computer programmed to determine a type of tire blowout based at least on a location of the tire blowout and a steering angle at the time of tire blowout, and based at least on the type of tire blowout, to limit at least one of a powertrain and a braking of a vehicle.

16 Claims, 5 Drawing Sheets

(51) Int. Cl.
*B60W 10/04* (2006.01)
*B60W 10/18* (2012.01)
*B60W 30/02* (2012.01)
*B60W 30/12* (2006.01)
*B60K 28/14* (2006.01)
*B60W 10/06* (2006.01)
*B60W 10/184* (2012.01)

(52) U.S. Cl.
CPC ..... *B60W 2540/18* (2013.01); *B60W 2710/06* (2013.01); *B60W 2710/18* (2013.01)

(56) References Cited

U.S. PATENT DOCUMENTS

| | | | |
|---|---|---|---|
| 7,069,134 | B2 | 6/2006 | Williams |
| 7,207,579 | B1 | 4/2007 | Howard |
| 7,677,095 | B1* | 3/2010 | Bartol ................... B60T 8/1725 73/146.2 |
| 7,983,801 | B2* | 7/2011 | Milot ....................... B60C 23/04 303/146 |
| 2005/0080546 | A1* | 4/2005 | Milot ....................... B60C 23/00 701/70 |
| 2006/0111829 | A1* | 5/2006 | Williams ................ B60C 23/04 701/79 |
| 2006/0253240 | A1* | 11/2006 | Rao ................... B60W 50/0205 701/48 |
| 2006/0267750 | A1 | 11/2006 | Lu et al. |
| 2008/0147277 | A1* | 6/2008 | Lu ....................... B60W 30/085 701/45 |
| 2008/0216567 | A1* | 9/2008 | Breed ..................... B60C 11/24 73/146.5 |
| 2013/0253793 | A1* | 9/2013 | Lee ..................... B60W 50/029 701/70 |
| 2014/0239603 | A1* | 8/2014 | Balandin ................ B62D 17/00 280/5.521 |
| 2015/0204398 | A1* | 7/2015 | Qiang ..................... F16D 55/40 188/71.5 |
| 2017/0137023 | A1* | 5/2017 | Anderson .......... B60G 17/0195 |
| 2018/0170125 | A1* | 6/2018 | Woodley ............... B60C 23/003 |
| 2018/0237001 | A1* | 8/2018 | Lian ....................... B60W 10/08 |

FOREIGN PATENT DOCUMENTS

| | | |
|---|---|---|
| CN | 107336707 A * | 11/2017 |
| WO | 2017028800 A1 | 2/2017 |

OTHER PUBLICATIONS

UK Search Report dated Jun. 7, 2018 re Appl. No. GB1720179.9.

* cited by examiner

TIRE BLOWOUT CONTROL

BACKGROUND

A sudden loss of pressure in a vehicle tire, such as when the vehicle tire experiences a blowout, may adversely affect the performance and stability of the vehicle. The tire blowout causes a change in the frictional co-efficient between the tire and a driving surface, decreasing longitudinal and lateral control, and causing an imbalance in the handling of the vehicle. Current vehicle control systems utilize vehicle yaw, lateral acceleration, and wheel speed when providing enhanced computer assisted control to a powertrain or brakes of the vehicle.

DETAILED DESCRIPTION

Introduction

Figure 1:
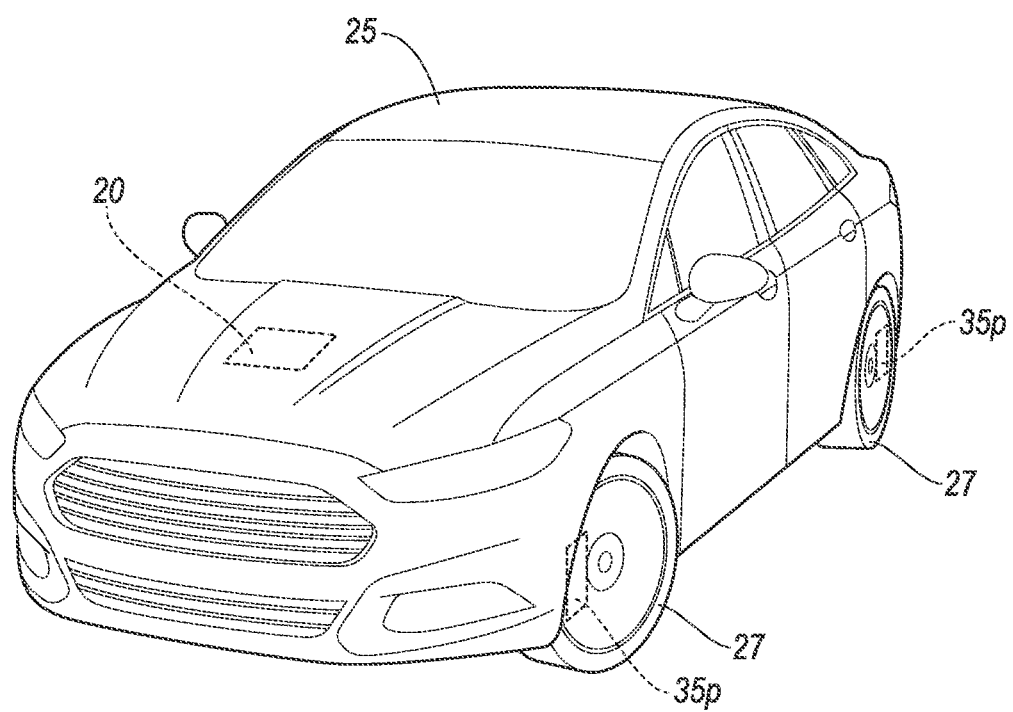
FIG. 1 is a perspective view of an example vehicle having an example tire blowout control system.

A vehicle control system 20 (see FIGS. 1 and 2) provides a hardware and software infrastructure to mitigate adverse effects relating to the performance and stability of a vehicle 25 that experienced a blowout, i.e., a rapid loss of pressure, of a tire 27 of the vehicle. Accordingly, a computer 30 of the system 20 in the vehicle 25 is programmed to determine a type of tire blowout based at least on a location, i.e., a specific wheel of the vehicle 25 such as right-front, right-rear, etc., of the tire blowout and a steering angle A, i.e., an angular deviation of both direction and magnitude of wheels of the vehicle from a straight position where front and rear wheels are generally parallel, at the time of tire blowout. The computer 30 limits at least one of a powertrain 40 and a braking 45 of the vehicle 25 based at least on the type of tire blowout.

The computer 30 may apply the limits to the powertrain 40 and/or braking 45 when actuating lane keeping system 50 and stability system 55 controls of the system 20.

In the following description, the relative directions ahead, behind, front, rear, right, and left are from the perspective of an occupant seated in a driver seat, facing a dashboard of the vehicle 25. The directions inside and outside are relative to a turning direction of the vehicle 25. For example, when the steering angle A is to the right, the inside is on the right and the outside is on the left. When the steering angle A is to the left the inside is on the left and the outside is on the right. Additionally, the adjectives "first" and "second" are used throughout this document as identifiers and are not intended to signify importance or order.

System

Figure 2:
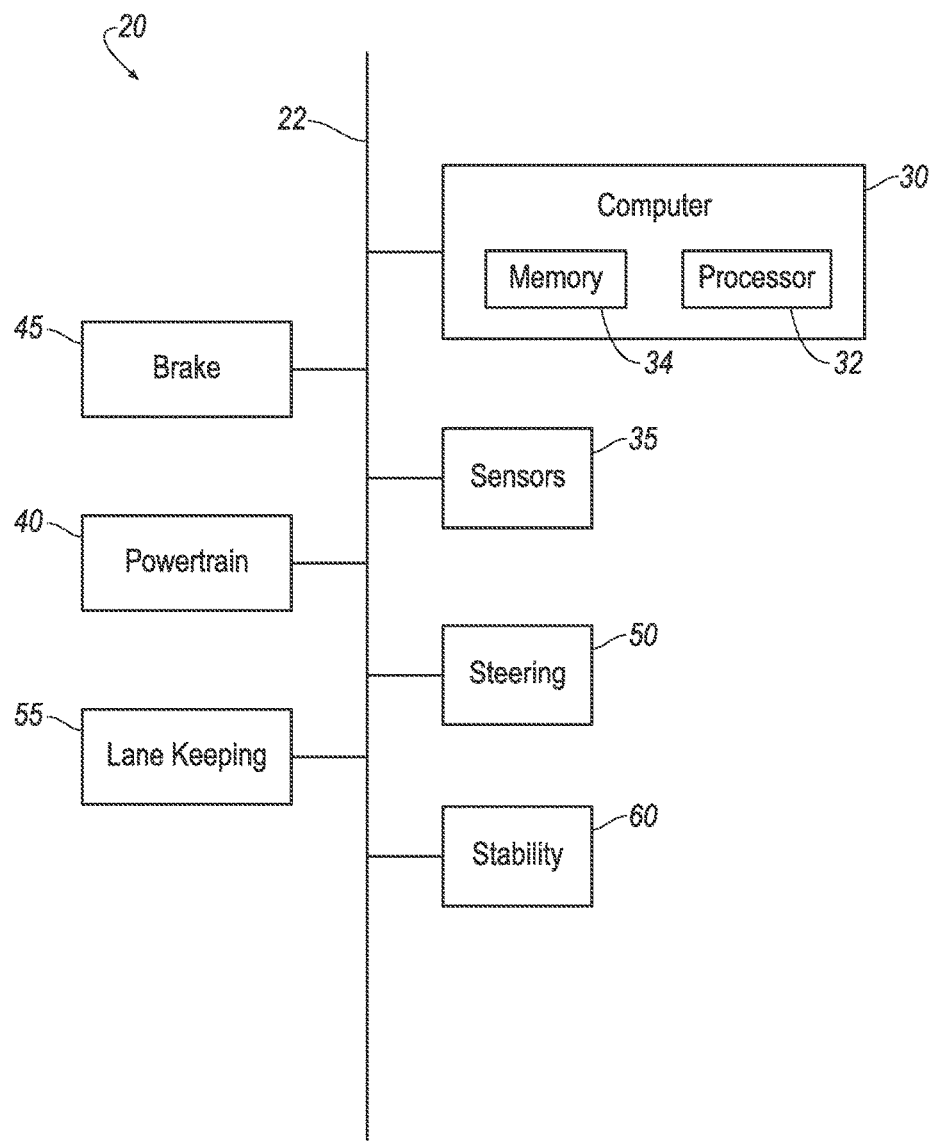
FIG. 2 is a block diagram of components of the example tire blowout control system of FIG. 1.

As shown in FIGS. 1 and 2, a vehicle tire blowout control system 20 includes a computer 30 in communication with one or more sensors 35, a powertrain 40, a braking 45, a lane keeping system 50, a stability system 55, and a steering 60.

The computer 30 is a computing device that includes a processor 32 and a memory 34.

The processor 32 is implemented via circuits, chips, or other electronic components and may include one or more microcontrollers, one or more field programmable gate arrays (FPGAs), one or more application specific circuits (ASICs), one or more digital signal processors (DSPs), one or more customer integrated circuits, etc. The processor 32 is programmable to process the data and communications received via the memory 34, the sensors 35, the powertrain 40, the braking 45, the lane keeping system 50, the stability system 55, and the steering 60. Processing the data and communications may include processing to determine a type of tire blowout based at least on a steering angle A of the vehicle 25 and a location of the blowout relative to the vehicle 25. Processing the data and communications may include processing to limit the powertrain 40 and/or the braking 45 of the vehicle 25 based at least on the type of tire blowout. As described below, the processor 32 instructs vehicle 25 components to actuate based on the sensor data.

The memory 34 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 34 may store instructions for performing the processes described herein, and data collected from sensors and communications.

The memory 34 may store a lookup table for use by the processor 32 when processing data and controlling various vehicle systems. For example, the lookup table may correlate the various blowout locations and the steering angle A at the time of the blow out with blowout types and responsive controls to the powertrain 40 and braking 45. An example lookup table is shown below:

| Blowout Attribute Determinations | | | | Responses | |
| --- | --- | --- | --- | --- | --- |
| Steering Angle > 0 | At Front Location? | At Inside Location | Blowout Type | Limit Braking | Limit Powertrain |
| No | Yes | na | 1st Type | Yes | No |
| No | No | na | 2nd Type | No | Yes |
| Yes | Yes | Yes | 3rd Type | Yes - 1st Amount | No |
| Yes | Yes | No | 4th Type | Yes - 2nd Amount | No |
| Yes | No | Yes | 5th Type | Yes - 1st Amount | Yes - 1st Amount |
| Yes | No | No | 6th Type | Yes - 2nd Amount | Yes - 2nd Amount |

In the table, blowout attribute determinations include evaluating if the steering angle A is greater than zero at the time of the blowout, and evaluating the location the tire blowout relative to the vehicle 25, e.g., at the front or rear, and relative to the steering angle A, e.g., at the inside or the outside. The determinations are made by the computer 30 based on data received from various sensors 35 and other vehicle components and systems.

The blowout type is a category of blowout defined by the blowout attribute determinations. Each blowout type is associated with a combination of attributes, e.g. steering angle and location determinations.

The responses are controls implemented by the computer 30 to various vehicle systems and subsystems. For example, the computer 30 may respond to a certain blowout type by limiting an output of the powertrain 40, or limiting a maximum amount of force that can be applied to a wheel by the braking 45.

The computer 30 is in electronic communication with one or more conventional and known (and therefore not shown in the drawings) input devices for providing data to the computer 30 and one or more output devices for receiving data and/or instructions from the computer 30 e.g., to actuate an output device. Exemplary input devices include: human machine interfaces (HMIs) such as a switch or graphical user interface (GUI); imaging devices such as LiDAR, still and/or video cameras, infrared sensors, the sensors 35, the powertrain 40, the braking 45, the lane keeping system 50, the stability system 55, the steering 60, etc., as well as other sensors and/or electronic control units (ECUs) that are known to provide data, e.g., on a vehicle communications bus or network 22, such as, radar, ultrasonic sensors, accelerometers, gyroscopes, pressure sensors, thermometers, barometers, altimeters, current sensing devices, voltage sensing devices, microphones, light sensors, etc. etc. Exemplary output devices that may be actuated by the computer 30 include: warning light and audible subsystems; HMIs, the powertrain 40, the braking 45, the lane keeping system 50, the stability system 55, the steering 60, etc.

The sensors 35 collect and send data to the computer 30. The sensors 35 may detect internal states of the vehicle 25, for example, wheel speed, wheel orientation, tire pressure, and engine and transmission variables. For example, a tire pressure sensor 35$p$ may be supported by each of the tires 27. The sensors 35 may detect the position or orientation of the vehicle 25, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 35 may detect the external world, for example, light measurement sensors, photometers, wind speed measurement sensors, radar sensors, scanning laser range finders, light detection and ranging (LIDAR) devices, and image processing sensors such as cameras.

The powertrain 40 is in communication with the computer 30, such as through the vehicle bus or network 22. Upon actuation, the powertrain 40 provides a torque to wheels of the vehicle 25, propelling the vehicle 25 forward. The powertrain 40 may include an electric and/or an internal combustion engine. In a conventional powertrain, the internal combustion engine is rotationally coupled to the transmission. In a conventional electric powertrain, the electric motor is rotationally coupled to the transmission. In a hybrid powertrain, the electric motor is coupled to the transmission and transmits rotational kinetic energy to the transmission, and the internal-combustion engine may be coupled to the electric motor or to the transmission. The transmission transmits the kinetic energy from the electric motor and/or the internal-combustion engine to a drive axle and ultimately to wheels of the vehicle 25, while applying a gear ratio allowing different tradeoffs between torque and rotational speed.

The braking 45 is in communication with the computer 30, such as through the vehicle bus or network 22. Upon actuation, the braking 45 resists the motion of the vehicle to thereby slow and/or stop the vehicle 25. The braking 45 may provide resistance to one wheel of the vehicle 25 independent of other wheels of the vehicle. Exemplary known braking vehicle systems include friction brakes such as disc brakes, drum brakes, band brakes, and so on; regenerative brakes; engine brakes; any other suitable type of brakes; or a combination thereof.

The lane keeping system 50 tracks the present location of the vehicle 25 relative to a lane of travel. The lane keeping system 50 may utilize a computing device, such as the computer 30, in communication with various sensors 35 such as forward looking visual sensors, e.g. known vehicle camera sensors, LIDAR, etc., to monitor lane marking on a road way. The lane keeping system 50 may be in communication with the steering 60 and the computer 30, such as through the vehicle network or bus 22, with the lane keeping system 50 programmed to actuate the steering 60 to maintain the vehicle 25 within the lane markings based at least on the information received from the forward looking visual sensors, e.g. using known lane monitoring and departure control algorithms.

The stability system 55 system (or subsystem) reduces traction loss of the vehicle 25, such as that generated from acceleration, deceleration, turning, or a combination thereof, in excess of that permitted by vehicle 25 and road conditions. The stability system 55 may utilize a computing device, such as the computer 30, in communication with various sensors 35 to monitor a rotational speed of each wheel of the vehicle 25, a rotation, i.e., yaw, of the vehicle, an acceleration and declaration of the vehicle, and a lateral movement of the vehicle. The stability system 55 may be in communication with the computer 30, the powertrain 40 and braking 45, such as through the vehicle network or bus 22. Based on the information received from the various sensors 35, the stability system 55 may limit the powertrain 40 and/or actuate the braking 45, including actuating braking of one or more wheels independent of the other wheels, to minimize traction loss, e.g., by using known algorithms.

The steering 60 is in communication with the computer 30, such as through the vehicle bus or network 22. Upon actuation, the steering 60 alters and/or maintains the steering angle A of one or more tires 27 of the vehicle 25. For example, the steering 60 controls known electric and hydraulic systems in the vehicle 20 which affect the steering angle A of one or more tires 27 of the vehicle 25. The steering 60 may include one or more sensors 35, such as known position sensors, to detect the steering angle A.

Process

Figure 3A:
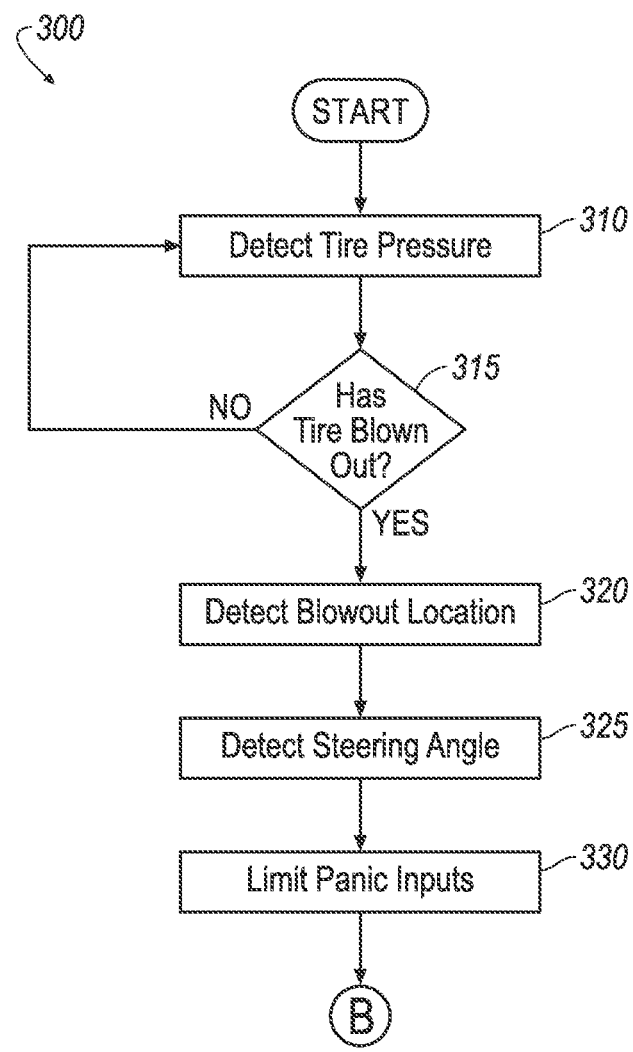
FIGS. 3A-3B illustrate a flow chart of an example process for tire blowout control.
Figure 3B:
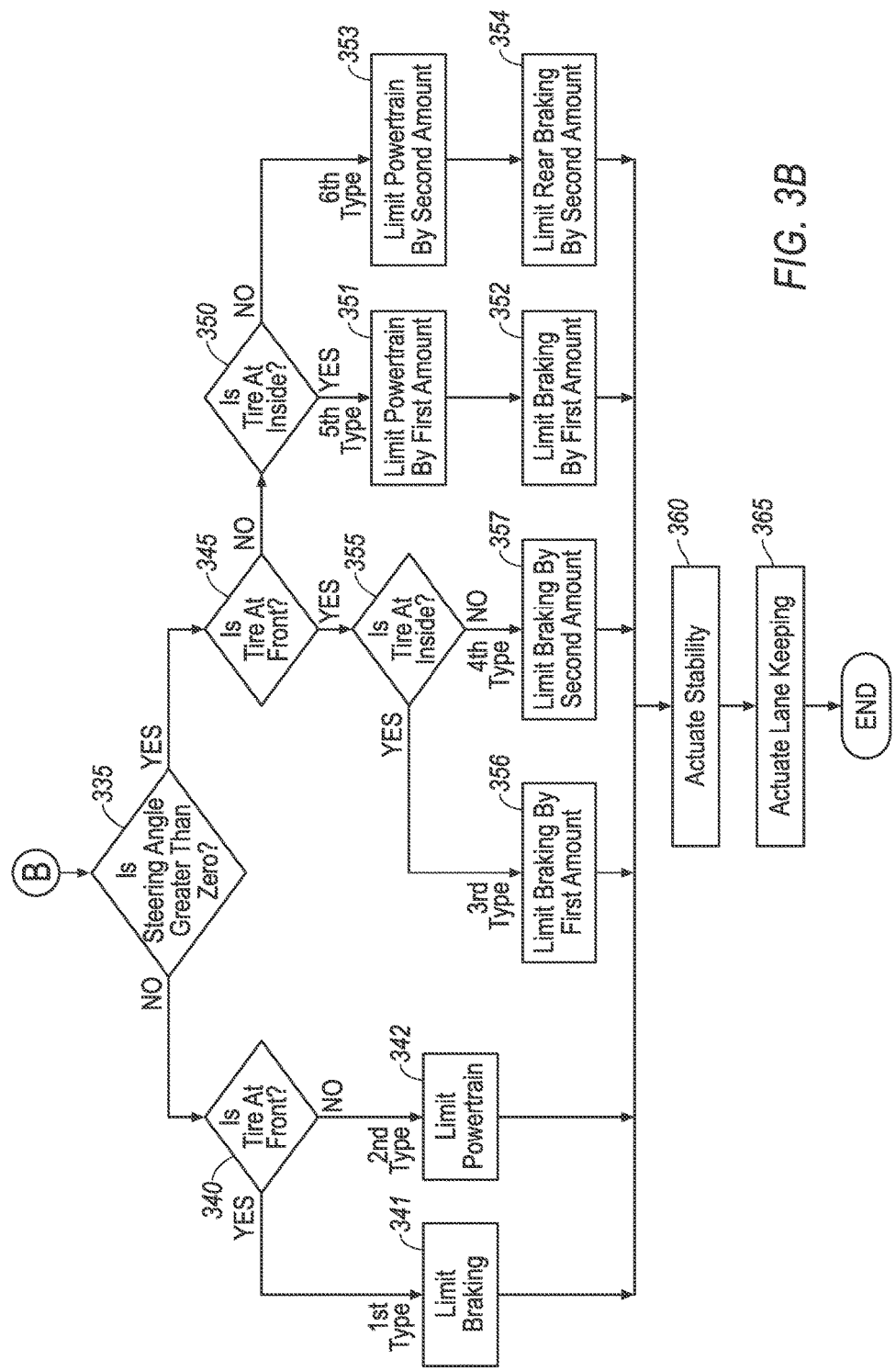

Referring to FIG. 3, the process 300 may begin when the vehicle 25 is powered on, put into a drive gear, or is otherwise placed in a ready condition to operate.

Next, at a block 310, the computer 30 detects the tire pressure of the various tires 27 of the vehicle 25. The tire pressure may be determined with a tire pressure sensor 35$p$ supported by each tire 27.

At a block 315, the computer 30 determines whether a blowout has occurred at any of the tires 27. For example, the blowout may be determined to have occurred based on a sudden loss of tire pressure in one of the tires 27, e.g., the tire pressure of one of the tires 27 drops to be generally equal to zero within a few milliseconds. When the determination is made that the blowout has occurred, the process 300 moves to a block 320. Else, the process 300 returns to the block 310.

Figure 4:
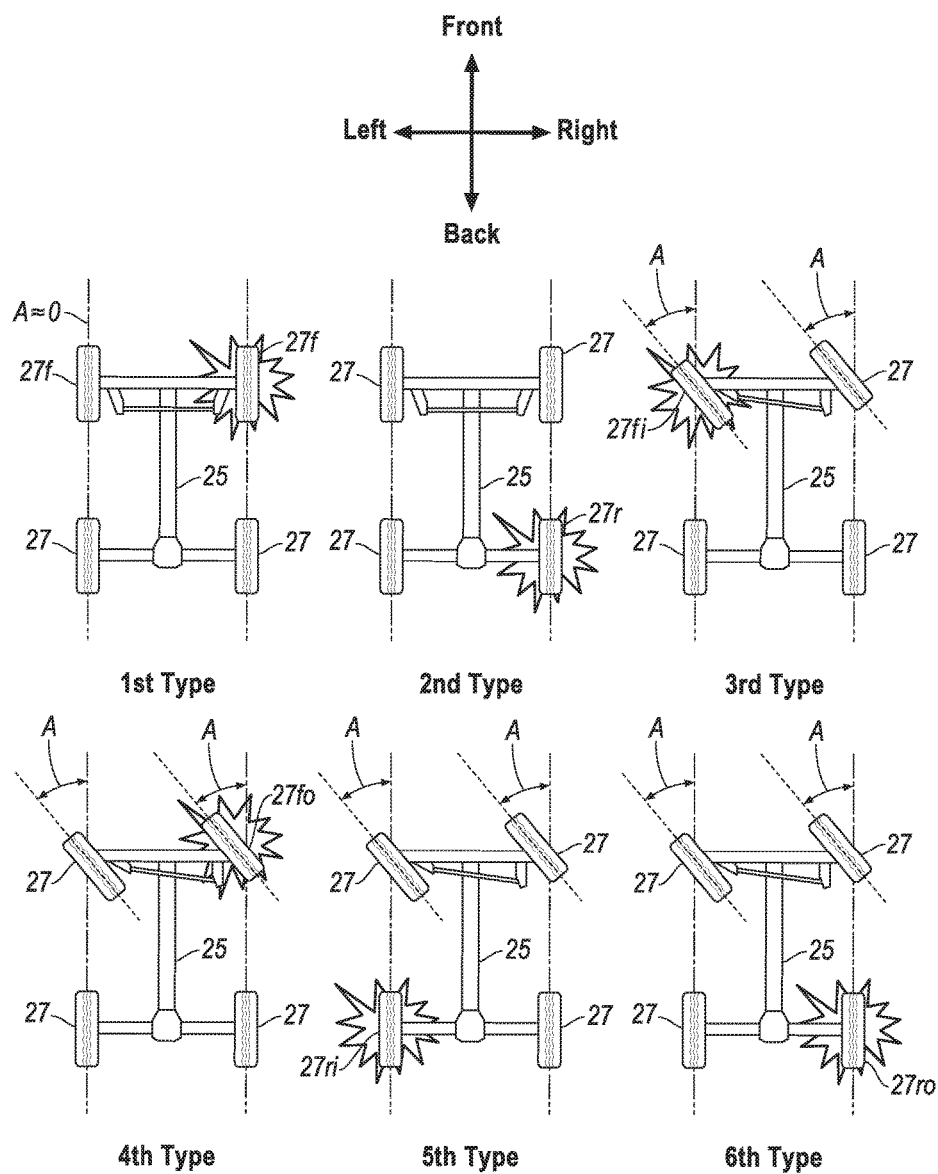
FIG. 4 is a top plan view illustrating vehicles experiencing a tire blowout at different locations.

At the block 320, the computer 30 detects a location of the blowout. As shown in FIG. 4, the location on the vehicle 25 may be at a front relative to the vehicle 25, such as at tire 27$f$, tire 27$fi$, and/or tire 27$fo$. The location be at a rear relative to the vehicle 25, such as at tire 27$r$, tire 27$ri$, and tire 27$ro$. The location may be at a right or left relative to the vehicle 25. The location may be at an inside relative to the steering angle A, such as at tire 27$fi$ and tire 27$ri$. The location may be at an outside relative to the steering angle A, such as at tire 27$fo$ and tire 27$ro$. The computer 30 may determine the location of the blowout based on input received from the sensors 35. For example, the tire pressure sensor 35$p$ supported by each tire 27 may communicate information identifying the location, such as the sensor 35*p* sending tire pressure data including specific identifying data that identifies the location and/or an identity of the sensor 35*p*. The identity of various sensors 35*p* may be associated with the location on a look up table stored on the memory 34.

At a block 325, the computer 30 detects a steering angle A of the vehicle 25 at the time of the blowout. With reference to FIG. 4, the steering angle A is the deviation of wheels of the vehicle 25 from a position where the vehicle 25 travels in a straight line, i.e., when the front wheels are generally parallel with the rear wheels. For example, when the wheels are pointed straight ahead, the steering angle A is zero. The steering angle A increases as the wheels are turned away from straight ahead, either to the right or left. The steering angle A may be determined by the computer 30 based on data received from the steering 60, for example, the steering 60 may collect steering angle data from a position sensor that is a component of, and supported on, the steering 60, and send steering angle A data to the computer 30. Additional, or alternatively, the computer 30 may receive data from one or more sensors 35 indicating the steering angle A, for example by using known steering position sensors.

At the block 330, the computer 30 limits panic inputs from a vehicle operator that may be received in response to the tire blowout. Panic inputs are sudden inputs of disproportionate magnitude to controls of the vehicle 25 by the operator in response to the blowout. Examples of panic inputs include the operator rapidly pressing a brake pedal through its full range of motion and/or providing an over correction input to a steering wheel. Panic inputs may be identified by the computer 30 based on a rate and/or magnitude of the input provided immediately succeeding, i.e., occurring less than one second after, the blowout. Limiting panic inputs may include providing a force feedback to the various input devices, and/or instructing the steering 60 to limit a change in the steering angle A, e.g., by the computer 30 instructing the steering 60 to maintain the steering angle A within a range of motion of the steering angle A when the blowout occurred, such as within +/−3 degrees, and instructing the braking 45 to limit the resistance to motion, e.g., by computer 30 instructing the braking 45 to refrain from applying more that certain amount, such as 50%, of a maximum resistance capable of being generated by the braking 45.

Limiting panic inputs may further limit the steering 60 based on the location of the blowout by inhibiting a change in steering angle A towards a side of the vehicle 25 where the blowout occurred. For example, when the blowout is on the right, the computer 30 by inhibit the steering 60 from actuating to turn the wheels to the right. Similarly, when the blowout is on the left, the computer 30 by inhibit the steering 60 from actuating to the wheels turn to the left.

At a block 335, the computer 30 determines whether the steering angle A is substantially greater than zero. The determination is based at least on the detected steering angle A from the block 325. The steering angle A is substantially greater than zero when the steering angle A at a given speed causes the weight distribution of the vehicle 25 to shifted. For example, the steering angle A may be considered to be substantially greater than zero if it causes a weight shift to one side of the vehicle be greater than a certain amount, e.g. 5%. The steering angle A may be considered to be substantially greater than zero if it is above a certain amount of deviation from zero, e.g., greater than 1 degree. When the computer 30 determines the steering angle A is not substantially greater than zero, the process 300 moves to a block 340. When the computer 30 determines the steering angle A is substantially greater than zero, the process 300 moves to a block 345.

At the block 340, the computer 30 determines whether the blowout was located at the front of the vehicle 25. The determination is based at least on the detected location of the blowout from the block 320. When the blowout is located at the front, the process 300 moves to a block 341. Else, e.g., when the blowout is located at the rear, the process 300 moves to a block 342.

At the block 341, in response to determining that the steering angle A is not substantially greater than zero, and that the blowout was located at the front, the computer 30 limits the braking 45 to one or more tires 27 the vehicle 25. The computer 30 may limit the braking 45 by controlling a maximum resistance to motion generated by the braking 45, such as by limiting the application of force to a disc or drum by a brake pad relative to a maximum force applicable to the drum or brake by a predetermined amount, e.g., 50%. Limiting the braking 45 to one or more tires 27 of the vehicle 25 may be provided equally to the various tires 27. Alternatively, limiting the braking 45 to one or more tires 27 of the vehicle 25 may be provided by limiting individual tires 27 by different amounts, such as limiting only the tire that experienced blowout, i.e., tire 27*f* in FIG. 4, or limiting the tire 27*f* that experienced blowout more than the other tires 27. Determining how much the braking 45 is limited to the tires may be based on factors such as vehicle weight, center of gravity, center of rotation, speed, surface traction, etc.

At the block 342, in response to determining that the steering angle A is not substantially greater than zero, and that the blowout was not located at the front (e.g. the blowout was at the rear), the computer 30 limits the output of the powertrain 40 of the vehicle 25. The computer 30 may limit powertrain 40 by controlling a maximum motive force provided by the powertrain 45, such as by limiting the output of the engine and/or motor of the powertrain 40 relative to a maximum output of the engine/motor by a predetermined amount, e.g., 50%. Determining how much the powertrain 40 is limited may be based on factors such as vehicle weight, center of gravity, center of rotation, speed, surface traction, etc.

At the block 345, the computer 30 determines whether the blowout was located at the front of the vehicle 25. The determination is based at least on the detected location of the blowout from the block 320. When the blowout was not located at the front, e.g. when the blowout was at the rear, the process 300 moves to a block 350. Else, i.e., when the computer 30 determines the blowout was at the front, the process 300 moves to a block 355.

At a block 350, the computer 30 determines whether the blowout was located at an inside of the vehicle 25. The inside is relative to a turning direction of the vehicle 25. For example, when the steering angle A is to the right, the inside is on the right and the outside is on the left. The determination is based at least on the detected location of the blowout from the block 320. When the blowout was located at the inside, the process 300 moves to a block 351 and/or a block 352. Else, e.g. when the blowout was at the outside, the process 300 moves to a block 353 and/or a block 354.

At the block 351, in response to determining that the steering angle A is substantially greater than zero, that the blowout was not located at the front (e.g. the blowout was at the rear), and that the blowout was located at the inside, the computer 30 limits output of the powertrain 40 of the vehicle by a first amount. The first amount is less than a second amount discussed below at block 352. The computer 30 may limit powertrain 40 by controlling a maximum motive force provided by the powertrain 45, such as by limiting the output of the engine and/or motor of the powertrain 40, such as limiting the powertrain 40 by a predetermined amount, e.g. 25% of its total available output. Determining how much the powertrain 40 is limited may be based on factors such as vehicle weight, center of gravity, center of rotation, speed, surface traction, etc.

At the block 352, also in response to determining that the steering angle A is substantially greater than zero, that the blowout was not located at the front (e.g. the blowout was at the rear), and that the blowout was located at the inside, the computer 30 limits braking 45 of the vehicle 25 by a first amount. The first amount is less than a second amount discussed below at block 354. The computer 30 may limit the braking 45 by controlling a maximum resistance to motion generated by the braking 45, such as by limiting the application of force to a disc or drum by a brake pad by a predetermined amount, e.g. 75% of its total available output. Limiting the braking 45 may be provided equally to the various tires 27. Alternatively, limiting the braking 45 may be provided by limiting individual tires 27 by different amounts, such as limiting only the tire 27 that experienced a blowout, i.e., the tire 27*ri* in FIG. 4, or limiting the tire 27*ri* that experienced blowout more than the other tires 27. Determining how much the braking 45 is limited to the tires may be based on factors such as vehicle weight, center of gravity, center of rotation, speed, surface traction, etc.

At the block 353, in response to determining that the steering angle A is substantially greater than zero, that the blowout was not located at the front (e.g. the blowout was at the rear), and that the blowout was not located at the inside (e.g. the blowout was at the outside), the computer limits output of the powertrain 40 of the vehicle by the second amount. The second amount is greater than the first amount discussed above at the block 351. The computer 30 may limit powertrain 40 by controlling a maximum motive force provide by the powertrain 45, such as by limiting the output of the engine and/or motor of the powertrain 40 relative to a maximum output of the engine/motor by a predetermined amount, e.g., 30%. Determining how much the powertrain 40 is limited may be based on factors such as vehicle weight, center of gravity, center of rotation, speed, surface traction, etc.

At the block 354, also in response to determining that the steering angle A is substantially greater than zero, that the blowout was not located at the front (e.g. the blowout was at the rear), and that the blowout was not located at the inside (e.g. the blowout was at the outside), the computer 30 limits braking 45 of the vehicle 25 by the second amount. The second amount is greater than the first amount discussed above at block 352. The computer 30 may limit the braking 45 by controlling a maximum resistance to motion generated by the braking 45, such as by limiting the application of force to a disc or drum by a brake pad. The computer 30 may limit the braking 45 by controlling a maximum resistance to motion generated by the braking 45, such as by limiting the application of force to a disc or drum by a brake pad by a predetermined amount, e.g. 80% of its total available output. Limiting the braking 45 may be provided equally to the various tires 27. Alternatively, limiting the braking 45 may be provided by limiting individual tires 27 by different amounts, such as limiting only the tire that experienced blowout, i.e., the tire 27*ro* in FIG. 4, or limiting the tire 27*ro* that experienced blowout more than the other tires 27. Determining how much the braking 45 is limited to the tires may be based on factors such as vehicle weight, center of gravity, center of rotation, speed, surface traction, etc.

At a block 355, the computer 30 determines whether the blowout was located at the inside of the vehicle 25. The determination is based at least on the detected location of the blowout from the block 320. When the blowout was located at the inside, the process 300 moves to a block 356. Else, e.g. when the location was at the outside, the process 300 moves to a block 357.

At a block 356, in response to determining that the steering angle A is substantially greater than zero, that the blowout was located at the front, and that the blowout as located at the inside, the computer 30 limits braking 45 to one or more tires 27 of the vehicle 25 by a first amount. The first amount is less than a second amount discussed below at a block 357. The computer 30 may limit the braking 45 by controlling a maximum resistance to motion generated by the braking 45, such as by limiting the application of force to a disc or drum by a brake pad by a predetermined amount, e.g. 60% of its total available output. Limiting the braking 45 to one or more tires 27 of the vehicle 25 may be provided equally to the various tires 27. Alternatively, limiting the braking 45 to one or more tires 27 of the vehicle 25 may be provided by limiting individual tires 27 by different amounts, such as limiting only the tire that experienced blowout, i.e., tire 27*fi* in FIG. 4, or limiting the tire 27*fi* that experienced blowout more than the other tires 27. Determining how much the braking 45 is limited to the tires may be based on factors such as vehicle weight, center of gravity, center of rotation, speed, surface traction, etc.

At the block 357, in response to determining that the steering angle A is substantially greater than zero, that the blowout was located at the front, and that the blowout was not located at the inside (e.g., the blowout was at the outside), the computer 30 limits braking 45 to one or more tires 27 of the vehicle 25 by the second amount. The second amount is more than the first amount discussed above at the block 356. The computer 30 may limit the braking 45 by controlling a maximum resistance to motion generated by the braking 45, such as by limiting the application of force to a disc or drum by a brake pad by a predetermined amount, e.g. 75% of its total available output. Limiting the braking 45 to one or more tires 27 of the vehicle 25 may be provided equally to the various tires 27. Alternatively, limiting the braking 45 to one or more tires 27 of the vehicle 25 may be provided by limiting individual tires 27 by different amounts, such as limiting only the tire that experienced blowout, i.e., tire 27*fo* in FIG. 4, or limiting the tire 27*fo* that experienced blowout more than the other tires 27. Determining how much the braking 45 is limited to the tires may be based on factors such as vehicle weight, center of gravity, center of rotation, speed, surface traction, etc.

At a block 360, the computer 30 actuates the stability system 55 based at least on the detected location from the block 320, and on the detected steering angle A from the block 325. For example, the computer may apply the limits from one or more of the block 341, the block 342, the block 351, the block 352, the block 353, the block 354, the block 356, and/or the block 357, to the output of the stability system 55 controlling the braking 45 and/or the powertrain 40.

At a block 365, the computer 30 actuates the lane keeping system 50 based at least on the detected location from the block 320, and on the detected steering angle A from the block 325. For example, the computer may apply the limits from one or more of the block 341, the block 342, the block 351, the block 352, the block 353, the block 354, the block 356, and/or the block 357, to the output of the lane keeping system 50 controlling the braking 45 and/or the powertrain 40.

The process 300 ends when the vehicle 25 is shut down, turned off, put into a park gear, or otherwise placed in a non-operational condition.

CONCLUSION

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

As used herein, the adverb "generally" modifying an adjective means that a shape, structure, measurement, value, calculation, etc. may deviate from an exact described geometry, distance, measurement, value, calculation, etc., because of imperfections in materials, machining, manufacturing, measurements, etc.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A computer comprising programming for:
    determining a tire blowout of a wheel of a vehicle and a steering angle of the vehicle at a time of the tire blowout; and
    based at least on a location of the wheel and the steering angle, resetting a maximum braking force to be applied to the wheel of the vehicle when braking the vehicle.

2. The computer of claim 1, the programing further comprising:
    when the location of the wheel is a vehicle front, limiting braking to one or more wheels of the vehicle.

3. The computer of claim 1, the programing further comprising:
    when the location of the wheel is a vehicle rear and the steering angle is determined to be substantially equal to zero, limiting a powertrain of the vehicle.

4. The computer of claim 1, the programing further comprising:
    when the steering angle is determined to be substantially greater than zero, and the location of the wheel is a vehicle front inside, limiting vehicle braking to one or more wheels by a first amount; and
    when the steering angle is determined to be substantially greater than zero, and the location of the wheel is a vehicle front outside, limiting vehicle braking to one or more wheels by a second amount;
    wherein the first amount is less than the second amount.

5. The computer of claim 1, the programing further comprising:
    when the steering angle is determined to be substantially greater than zero, and the location of the wheel is a vehicle rear inside, a powertrain of the vehicle by a first amount; and
    when the steering angle is determined to be substantially greater than zero, and the location of the wheel is a vehicle rear outside, limiting the powertrain of the vehicle by a second amount;
    wherein the first amount is less than the second amount.

6. The computer of claim 1, the programing further comprising:
    when the steering angle is determined to be substantially greater than zero, and the location of the wheel is a vehicle rear, limiting a powertrain of the vehicle.

7. The computer of claim 1, the programing further comprising:
    actuating a lane keeping system based at least on the maximum braking force.

8. The computer of claim 1, the programing further comprising:
    actuating a stability system based at least on the maximum braking force.

9. A method comprising:
determining a tire blowout of a wheel of a vehicle and a steering angle of the vehicle at a time of the tire blowout; and
based at least on a location of the wheel and the steering angle, resetting a maximum braking force to be applied to the wheel of the vehicle when braking the vehicle.

10. The method of claim 9, further comprising:
when the location of the wheel is a vehicle front, limiting vehicle braking to one or more wheels.

11. The method of claim 9, further comprising:
when the location of the wheel is a vehicle rear and the steering angle is determined to be substantially equal to zero, limiting a powertrain of the vehicle.

12. The method of claim 9, further comprising:
when the steering angle is determined to be substantially greater than zero, and the location of the wheel is a vehicle front inside, limiting vehicle braking to one or more wheels by a first amount; and
when the steering angle is determined to be substantially greater than zero, and the location of the wheel is a vehicle front outside, limiting vehicle braking to one or more wheels by a second amount;
wherein the first amount is less than the second amount.

13. The method of claim 9, further comprising:
when the steering angle is determined to be substantially greater than zero, and the location of the wheel is a vehicle rear inside, limiting a powertrain of the vehicle by a first amount; and
when the steering angle is determined to be substantially greater than zero, and the location of the wheel is a vehicle rear outside, limiting the powertrain of the vehicle by a second amount;
wherein the first amount is less than the second amount.

14. The method of claim 9, further comprising:
when the steering angle is determined to be substantially greater than zero, and the location of the wheel is a vehicle rear, limiting a powertrain of the vehicle.

15. The method of claim 9, further comprising:
actuating a lane keeping system based at least on the maximum braking force.

16. The method of claim 9, further comprising:
actuating a stability system based at least on the maximum braking force.

* * * * *